(12) United States Patent
Paglieroni et al.

(10) Patent No.: US 11,403,765 B2
(45) Date of Patent: Aug. 2, 2022

(54) AUTOMATIC THREAT RECOGNITION SYSTEM AND METHOD USING MATERIAL DISAMBIGUATION INFORMED BY PHYSICS IN X-RAY CT IMAGES OF BAGGAGE

(71) Applicant: Lawrence Livermore National Security, LLC, Livermore, CA (US)

(72) Inventors: David W. Paglieroni, Pleasanton, CA (US); Christian T. Pechard, San Ramon, CA (US); Harry E. Martz, Jr., Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 40 days.

(21) Appl. No.: 16/540,610

(22) Filed: Aug. 14, 2019

(65) Prior Publication Data

US 2021/0049767 A1     Feb. 18, 2021

(51) Int. Cl.
    *G06T 7/187*         (2017.01)
    *G01V 5/00*          (2006.01)
    *G06T 11/00*        (2006.01)

(52) U.S. Cl.
CPC ............ *G06T 7/187* (2017.01); *G01V 5/0008* (2013.01); *G06T 11/008* (2013.01); *G06T 2207/10081* (2013.01); *G06T 2211/408* (2013.01)

(58) Field of Classification Search
CPC . G06T 7/11; G06T 15/08; G06T 7/187; G06T 11/008; G06T 2207/10081;
(Continued)

(56) References Cited

U.S. PATENT DOCUMENTS

| 6,813,374 B1 | 11/2004 | Karimi et al. |
| 9,495,764 B1 | 11/2016 | Boardman et al. |

(Continued)

FOREIGN PATENT DOCUMENTS

| CN | 1321884 A | 11/2001 |
| KR | 10 20180009904 A | 1/2018 |

OTHER PUBLICATIONS

T. Pappas, "An Adaptive Clustering Algorithm for Image Segmentation", IEEE Trans. Sig. Proc., 3, Mar. 1994, pp. 162-177.
(Continued)

*Primary Examiner* — Kenny A Cese
(74) *Attorney, Agent, or Firm* — Harness, Dickey & Pierce, P.L.C.

(57) ABSTRACT

An automatic threat recognition (ATR) system is disclosed for scanning an article to recognize contraband items or items of interest contained within the article. The ATR system uses a CAT scanner to obtain a CT image scan of objects within the article, representing a plurality of 2D image slices of the article and its contents. Each 2D image slice includes information forming a plurality of voxels. The ATR system includes a computer and determines which voxels have a likelihood of representing materials of interest. It then aggregates those voxels to produce detected objects. The detected objects are further classified as items of interest vs. not of interest. The ATR system is based on learned parameters for a novel interaction of global and object context mechanisms. ATR system performance may be optimized by using jointly optimal global and object context parameters learned during training. The global context parameters may apply to the article as a whole and facilitate object detection. The object context parameters may apply to the individual object detections.

7 Claims, 13 Drawing Sheets

(58) Field of Classification Search
CPC ............ G06T 2211/408; G06K 9/6267; G06K 9/00536; G01V 5/0008; G01V 5/005
See application file for complete search history.

(56) References Cited

U.S. PATENT DOCUMENTS

| | | | |
|---|---|---|---|
| 2007/0014471 A1 | 1/2007 | Simanovsky et al. | |
| 2007/0235658 A1 | 10/2007 | Zimdars et al. | |
| 2010/0046704 A1* | 2/2010 | Song | G01N 23/04 378/57 |
| 2010/0296709 A1* | 11/2010 | Ostrovsky-Berman | G06T 7/162 382/128 |
| 2014/0010342 A1 | 1/2014 | Basu et al. | |
| 2015/0332448 A1 | 11/2015 | Zhang et al. | |
| 2017/0270366 A1 | 9/2017 | Kuznetsov et al. | |
| 2017/0365074 A1 | 12/2017 | Basu | |
| 2020/0051017 A1* | 2/2020 | Dujmic | G06N 3/08 |

OTHER PUBLICATIONS

R. Achanta, "SLIC Superpixels Compared to State-of-the-Art Superpixel Methods", IEEE Trans. PAMI, 34, 11, Nov. 2012, pp. 2274-228.

L. Shapiro and G. Stockman, "Computer Vision", New Jersey, Prentice-Hall, 2001, pp. 279-325.

D. Paglieroni, H. Chandrasekaran, C. Pechard and H. Martz Jr., "Consensus Relaxation on Materials of Interest for Adaptive ATR in CT Images of Baggage", Proc. SI18D SPIE Defense and Security Symposium, Anomaly Detection and Imaging with X-Rays (ADIX) III, Orlando, FL, USA, Apr. 17-18, 2018.

G. Landry, J. Seco, M. Gaudreault and F. Verhaegen, "Deriving effective atomic numbers from DECT based on a parameterization of the ratio of high and low linear attenuation coefficients," Phys. Med. Biol., 58, 6851-6866 (2013).

K. Bond, J. Smith, J. Treuer, S. Azevedo, J. Kailman and H. Martz Jr., ZeCalc Algorithm Details, Version 6, LLNL Tech. Rep., LLNL-TR-609327, (Jan. 2013).

S. Azevedo, H. Martz Jr., M. Aufderheide, W. Brown, K. Champley, J. Kailman, P. Roberson, D. Schneberk, I. Seetho and J. Smith, "System-independent characterization of materials using dual-energy computed tomography," IEEE Trans. Nuc. Sci., 63(1), 341-350 (2016).

K. Champley, S. Azevedo, I. Seetho, S. Glenn, L. McMichael, J. Smith, J. Kailman, W. Brown and H. Martz, "Method to Extract System-Independent Material Properties from Dual-Energy X-ray Ct," *IEEE Trans. Nuc. Sci.*, vol. 66, No. 3, 2019.

O. Ronneberger, P. Fischer and T. Brox, "U-Net: Convolutional Networks for Biomedical Image Segmentation". arXiv: 1505.04597, 2015.

Y. F. A. Gaus, N. Bhowmik, S. Akcay and T. Breckon, "Evaluating the Transferability and Adversarial Discrimination of Convolutional Neural Networks for Threat Object Detection and Classification within X-Ray Security Imagery," 2019 18th IEEE International Conference on Machine Learning and Applications (ICMLA), Boca Raton, FL, USA, 2019, pp. 420-425.

L. Breiman, "Random Forests", *Machine Learning*, 45, 2001, pp. 5-32.

Crawford, C., T04 Final Report: https://myfiles.neu.edu/groups/ALERT/stretegic_studies/T04FinalReport.pdf.

P. Ram and A. Gray, "Density Estimation Trees", Proc. KDD, Aug. 21-24, 2011, San Diego, CA, USA, Copyright 2011 ACM 978-1-4503-0813-Jul. 11, 2008.

A. Criminisi, J. Shotton and E. Konokoglu, "Decision Forests for Classification, Regression, Density Estimation, Manifold Learning and Semi-Supervised Learning", Microsoft Research Technical Report GTR-2011-114, 2011, pp. 68-91.

International Search Report and Written Opinion regarding International Application No. PCT/US2020/045976, dated Nov. 24, 2020.

Ao et al. Accurate Segmentation of CT Male Pelvic Organs via Regression-Based Deformable Models and Multi-Task Random Forests. IEEE Transactions on Medical imaging. Jun. 2016, vol. 35, No. 6, pp. 1532-1543 pages.

\* cited by examiner

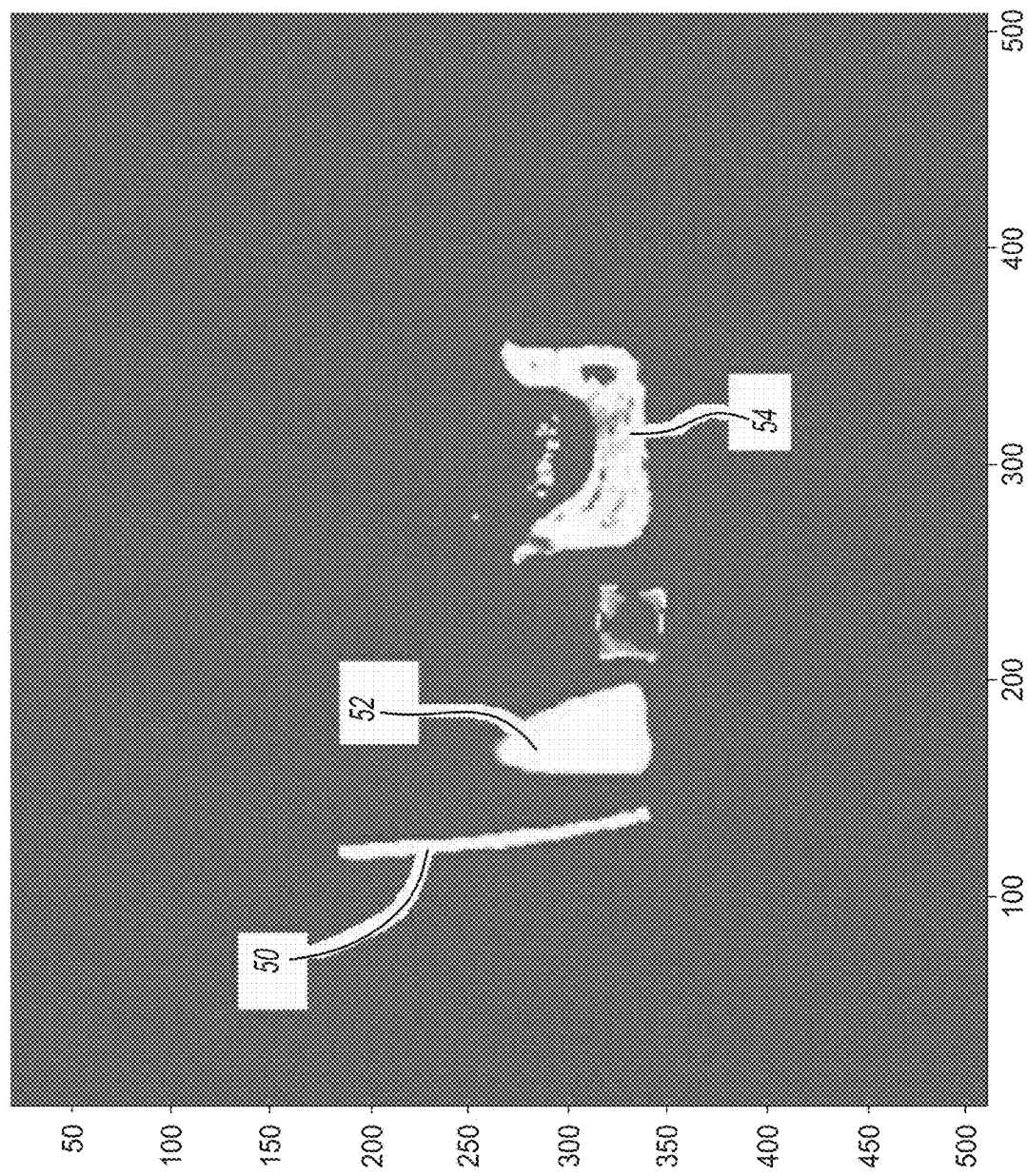

AUTOMATIC THREAT RECOGNITION SYSTEM AND METHOD USING MATERIAL DISAMBIGUATION INFORMED BY PHYSICS IN X-RAY CT IMAGES OF BAGGAGE

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to x-ray systems and methods for visually inspecting for contraband items in baggage such as suitcases, boxes, containers, purses, laptop cases, and carry-on bags, particularly at locations such as airports, and more particularly to a three dimensional computed axial tomography inspection system and accompany software for even more reliably identifying contraband items and items of interest in such baggage.

BACKGROUND

The statements in this section merely provide background information related to the present disclosure and may not constitute prior art.

In order to protect the traveling public, airports routinely scan for potential threats, for example, explosives or contraband such as handguns, knives, etc., in checked and carry-on bags. Systems that produce x-ray images of carry-on bags are in wide use at the present time at airports around the world. For carry-on bags, such systems typically produce an image in two dimensions (2D), which limits their effectiveness in being able to produce images of complexly shaped items enabling quick and reliable detection of such items as contraband items, or to verify that items being viewed are not contraband.

Computed tomography (CT) scanners have been used in medical applications for some time. CT scanners provide a significant advantage over conventional 2D x-ray systems in that CT scanners produce x-ray images of baggage in three dimensions (3D). While CT scanners are currently used in inspecting checked bags at airports, there is some belief that widespread adoption of CT scanners for also inspecting carry-on bags may provide a path towards increasing the probability of detecting threats while reducing the number of false alarms, and thus expedite the carry-on inspection process at airports. Moreover, by using dual energy as opposed to single energy scanners, the automatic threat recognition (ATR) software packaged with the scanner can be expected to even better discriminate objects in bags based on material composition, and not just shape.

The traditional approach to ATR when using CT images of baggage is to extract objects by segmenting the CT image directly, extracting object features, and classifying objects based on their features. This success of this approach is limited by how well the segmentation algorithm is able to extract objects. Unfortunately, algorithms that perform image segmentation in three dimensions lack robustness. Put differently, such presently used image segmentation algorithms often may work well for some images but not others.

One way to improve robustness of the image segmentation process is to use physics to inform the segmentation process. The CT image is first transformed into an image whose voxel values represent likelihoods that the voxel contains certain materials of interest. This transformation highlights only those voxels (typically a small percentage) that the segmenter software should consider, and it facilitates separation of objects by material type. However, the computed values of these likelihoods are based solely on local spatial context. Specifically, the likelihood value computed for a specific CT image voxel "v" is based solely on the values of voxels in a small local neighborhood centered on "v". Unfortunately, when an ATR is informed by physics in this way, its ability to distinguish multiple materials of interest is fundamentally limited. The problem becomes more severe when the number of materials of interest whose likelihood functions partially or greatly overlap grows. In this case, the various voxels in objects composed of a single material will often be classified as being composed of different but related materials. When this happens, the object can become highly fragmented and may thus go undetected.

SUMMARY

This section provides a general summary of the disclosure, and is not a comprehensive disclosure of its full scope or all of its features.

The present disclosure relates to an automatic threat recognition system for scanning an article to identify at least of a contraband item or an item of interest contained within the article. The system may comprise a computed axial tomography (CAT) scanner for scanning the article to obtain a CT image scan of the objects within the article. The CT image scan is represented by a plurality of two dimensional (2D) image slices of the article and its contents, wherein each (2D) image slice includes information forming a plurality of voxels. A computer may be included which is configured to receive the information and, for the voxels associated with the CT image, to perform a plurality of operations including: generating an alarm value for each voxel, the alarm value representing a likelihood that the voxel is associated with a material of interest (MOI) that may potentially be used to construct at least one of a contraband item or an item of interest, and create an initial iteration of an alarm image using the alarm values; to further analyze the alarm values of the voxels and aggregate ones of the voxels together based at least in part on the voxels having likelihoods of being of the same MOI, to create an enhanced alarm image in which at least one distinct object is discernable within the enhanced alarm image; and from the enhanced alarm image, to detect whether at least one of the distinct objects represents at least one of a contraband item or an item of interest.

In another aspect the present disclosure relates to an automatic threat recognition (ATR) method for detecting at least one of a contraband item or an item of interest contained within an article, from a plurality of objects contained in the article. The method may comprise initially defining a plurality of materials of interest (MOIs) representing materials that are to be identified, and which may be used in constructing at least one of a contraband item or an item of interest. The method may further include using a computed axial tomography (CAT) scanner to scan the article to obtain a CT image scan of the objects within the article. The CT image scan represents a plurality of two dimensional (2D) image slices of the article and its contents, wherein each (2D) image slice includes information forming a plurality of voxels. The method may further include generating an alarm value for each said voxel and each said material of interest (MOI), the alarm value representing a likelihood that the voxel is associated with a specific one of the MOIs that may potentially be used to find at least one of a contraband item or an item of interest contained within the article. The method may further include using the voxel alarm values to create an initial alarm image, and then further analyzing the alarm values of the voxels and aggregating ones of the voxels together based at least in part on the voxels having likelihoods of being of the same MOI, to create an image of objects detected by the ATR, such image containing either no objects, one object or multiple objects. The method may further include using the enhanced alarm image to detect whether at least one of the distinct objects represents at least one of a contraband item or an item of interest.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

FIG. 2*e* shows the best alarm image constructed from the images of FIGS. 2*b*-2*d*;

DETAILED DESCRIPTION

Example embodiments will now be described more fully with reference to the accompanying drawings.

Figure 1:
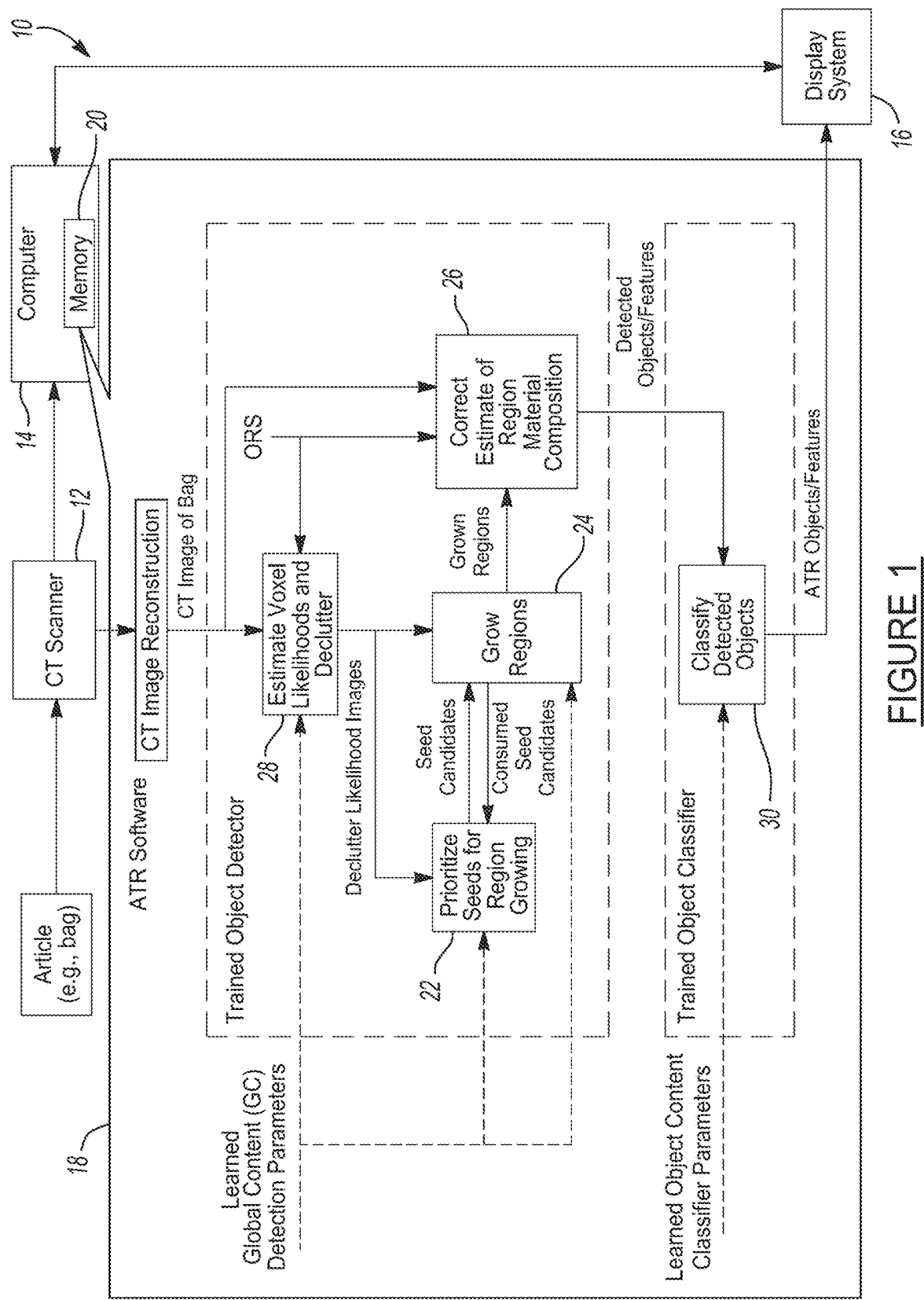
FIG. 1 is a high level block diagram of one example of an ATR system in accordance with the present disclosure, which is informed by learned parameters for interacting global context mechanisms and object context mechanisms by interacting spatial context mechanisms at a plurality of levels including a bag, a training set and object levels.

The present disclosure relates to an ATR system 10, as shown in FIG. 1, and related method for detecting contraband items and items of interest in bags, boxes and other types of containers where the contents may not be readily visually discernable. The ATR system 10 overcomes the limitations imposed by local spatial context on ATR performance by using a plurality of global spatial context mechanisms. In this example the ATR system 10 may include a CT scanner 12, a computer 14 and a display system 16 (e.g., LCD, LED, CRT, etc.). An ATR software module 18 (hereinafter "ATR software 18") may be stored in a non-volatile memory 20 (e.g., RAM, ROM, etc.) of the computer 14. The ATR software 18 may implement three software mechanisms or modules (i.e., software sub modules) for the global spatial context mechanisms, including 1) a "prioritize seeds for region growing" module 22 (hereinafter "PSRG module 22"), a Grow Regions module 24 (hereinafter "OR module 24"), a module for correcting the estimate of region material composition 26 (hereinafter the "CERMC module 26"). Additional modules/mechanisms may include a module for estimating voxel likelihoods and decluttering 28 (hereinafter simply "EVLD module 28", which also forms a global spatial context mechanism) and a module for classifying detected objects 28 (hereinafter "CDO module 28") as "threat" vs. "non-threat". The ATR system 10 is informed by interactions of modules 22-28, which constitute "global context" mechanisms, as well as CDO module 30, which constitutes an "object context" mechanism. A more detailed description of the operation of each of the modules 22-28 will now be presented.

Using Learned Parameters to Declutter Images of Alarm Voxels (EVLD Module 28)

For an x-ray CT image with voxels v(x,y,z) at column x and row y in slice z, the value v is a scalar for single energy scanners and a 2×1 vector for dual energy scanners. In the single energy case, v is typically a linear attenuation coefficient (LAC) µ for a single energy. In the dual energy case, v may represent a pair of LACs ($\mu_L$, $\mu_M$) at low and high energies, a pair of system independent rho Z (SIRZ) coefficients ($\rho_e$,$Z_e$) representing effective electron density and atomic number, a pair of synthesized monochromatic basis (SMB) coefficients ($\mu'_L$, $\mu'_H$), etc.

The material composition and physical feature characteristics for the objects of interest (OOIs) in baggage may be captured in an object requirements specification (ORS). The physical features of interest (FOIs) apply to object spatial context, for example, both the object and its surround. For explosives detection, the FOIs are typically not shape specific because explosives can come in almost any shape and size. Examples of possible FOIs for explosives include mass, thickness, texture, concealment (which reflects proximity to higher attenuating materials), etc. One may have access to CT training images with companion ground truth data that identifies the CT image voxels associated with specific materials of interest (MOIs). In this case, a likelihood function $p(v|M_k)$ can be approximated for each MOI $M_k$, k=1 . . . $n_{MOI}$ by fitting a curve in 1D or surface in 2D to the sample probability density function (PDF) derived from CT image voxels associated with that MOI (discussed further in connection with FIG. 2*g*). Note that the domain of $p(v|M_k)$ lies in the space of the voxel modality (e.g., a SIRZ, SMB or LAC space). If no ground truth is available, one may have to settle for an estimate of a rectangular region of responsibility (ROR) within voxel space that provides an estimate of the area over which $p(v|M_k)$ is nonzero. In this case, an estimate of $p(v|M_k)$ can be approximated by fitting a curve or surface to the ROR (discussed further in connection with FIG. 2*g*).

For the voxel at (x,y,z), one can compute an alarm value, $$a_k(x, y, z) = \tilde{p}(v(x, y, z) | M_k) \triangleq p(v(x, y, z) | M_k) / = \max_v p(v | M_k),$$

$$k = 1 \ldots n_{MOI}$$

Equation 1a for each MOI $M_k$ as a normalized likelihood value that varies from zero to one. Then for the background (non-MOI) case, $$a_0(x, y, z) = \begin{cases} 1 & \max_{k=1 \ldots n_{MOI}} a_k(x, y, z) = 0 \\ 0 & \text{otherwise} \end{cases} \quad \text{Equation 1b}$$

Since the variance of voxels values in a CT image over a MOI sample can be large relative to the domain of the MOI likelihood, one may wish to smooth the CT image prior to estimating likelihoods. Smoothing is a form of consensus relaxation in that it provides a neighborhood consensus of likelihood estimates for each voxel. Note that the alarm value in (1a) can be computed in other ways (e.g., as a posterior estimate).

For each MOI, the alarm image $a_k(x,y,z)$ is decluttered prior to region growing. The goal of decluttering is to improve object detection performance by reducing the number of small objects while separating larger objects that barely touch each other. Decluttering can be achieved by applying n iterations of annihilation (analogous to morphological erosion) followed by n iterations of restoration (analogous to morphological dilation) separately to each 3D alarm image $a_k(x,y,z)$. Only certain voxel aggregations that were not completely annihilated will be restored. Voxel (x,y,z) in $a_k(x,y,z)$ is annihilated (set to zero) if the mean of $a_k$ values (from the previous iteration of annihilation) within the $n_x \times n_y \times n_z$ neighborhood of (x,y,z) is $\leq a_{annihilate}$. Voxel (x,y,z) in $a_k(x,y,z)$ is restored (returned to its original value) if the mean of $a_k$ values (from the previous iteration of restoration) is $>a_{restore}$. $a_{restore}$ is typically less than $a_{annihilate}$ to make restoration easier than annihilation. For decluttering, the global context (GC) parameters that can be prescribed or potentially learned are thus the number of declutter iterations (n), the dimensions $n_x \times n_y \times n_z$ of the neighborhood (analogous to the morphological structuring element), and the annihilation/restoration parameters $a_{annihilate}$ and $a_{restore}$.

The best alarm and best MOI images (for the most likely MOI on a per voxel basis) are computed from decluttered alarm images for the individual MOIs as $$M(x, y, z) = \begin{cases} \underset{k=1 \ldots n_{MOI}}{\operatorname{argmax}} & \underset{k=1 \ldots n_{MOI}}{\max} \\ p(v(x, y, z) \mid M_k) & p(v(x, y, z) \mid M_k) > 0 \\ 0 & \text{otherwise} \end{cases} \quad \text{Equation 2}$$

$$p(x, y, z) = \begin{cases} p(v(x, y, z) \mid M(x, y, z)) & M(x, y, z) > 0 \\ 0 & \text{otherwise} \end{cases} \quad \text{Equation 3}$$

$$a(x, y, z) = p(x, y, z) \Big/ \max_v p(v \mid M(x, y, z)) \quad \text{Equation 4}$$

Figure 2A:
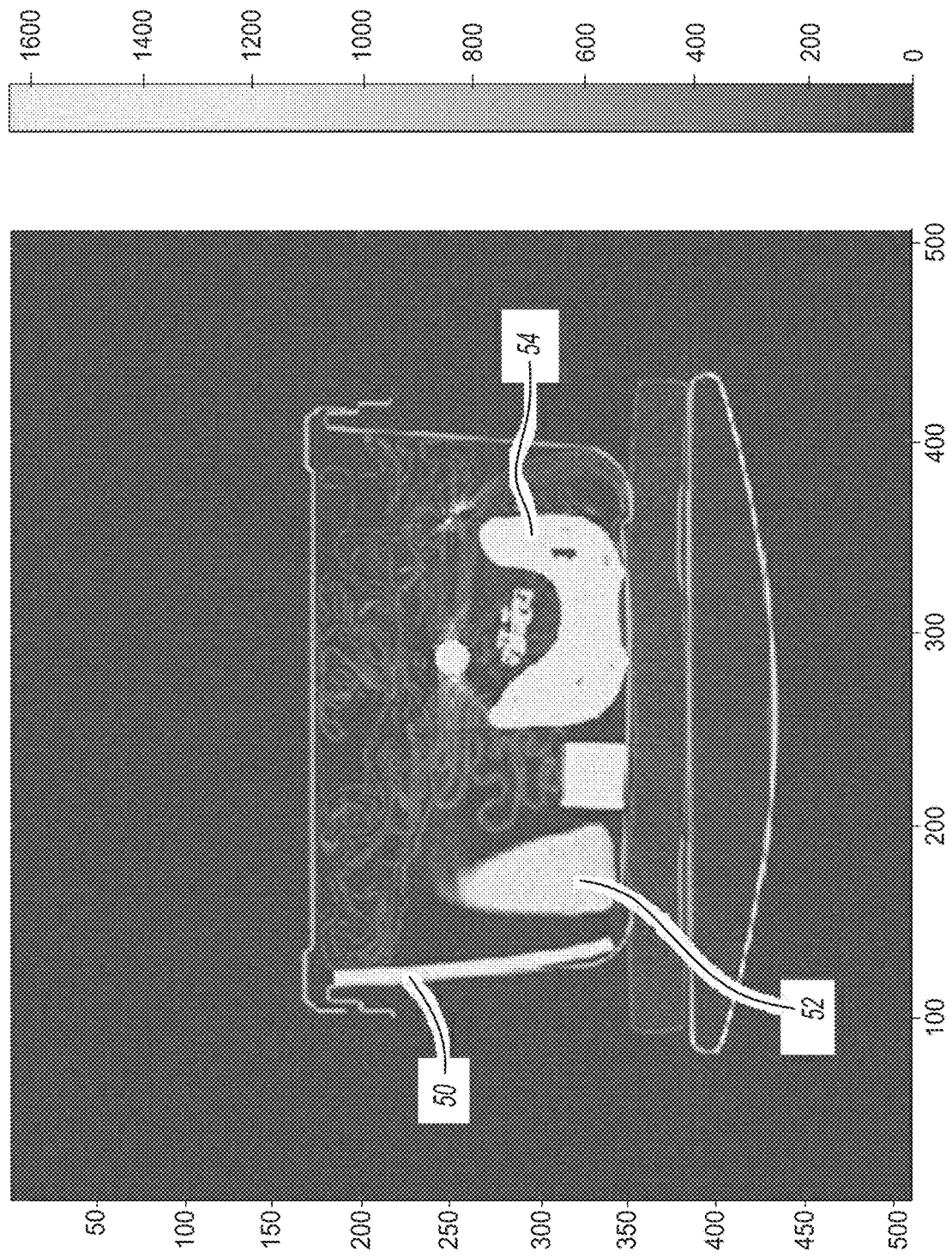
FIG. 2*a* shows one slice of a single energy CT.
Figure 2B:
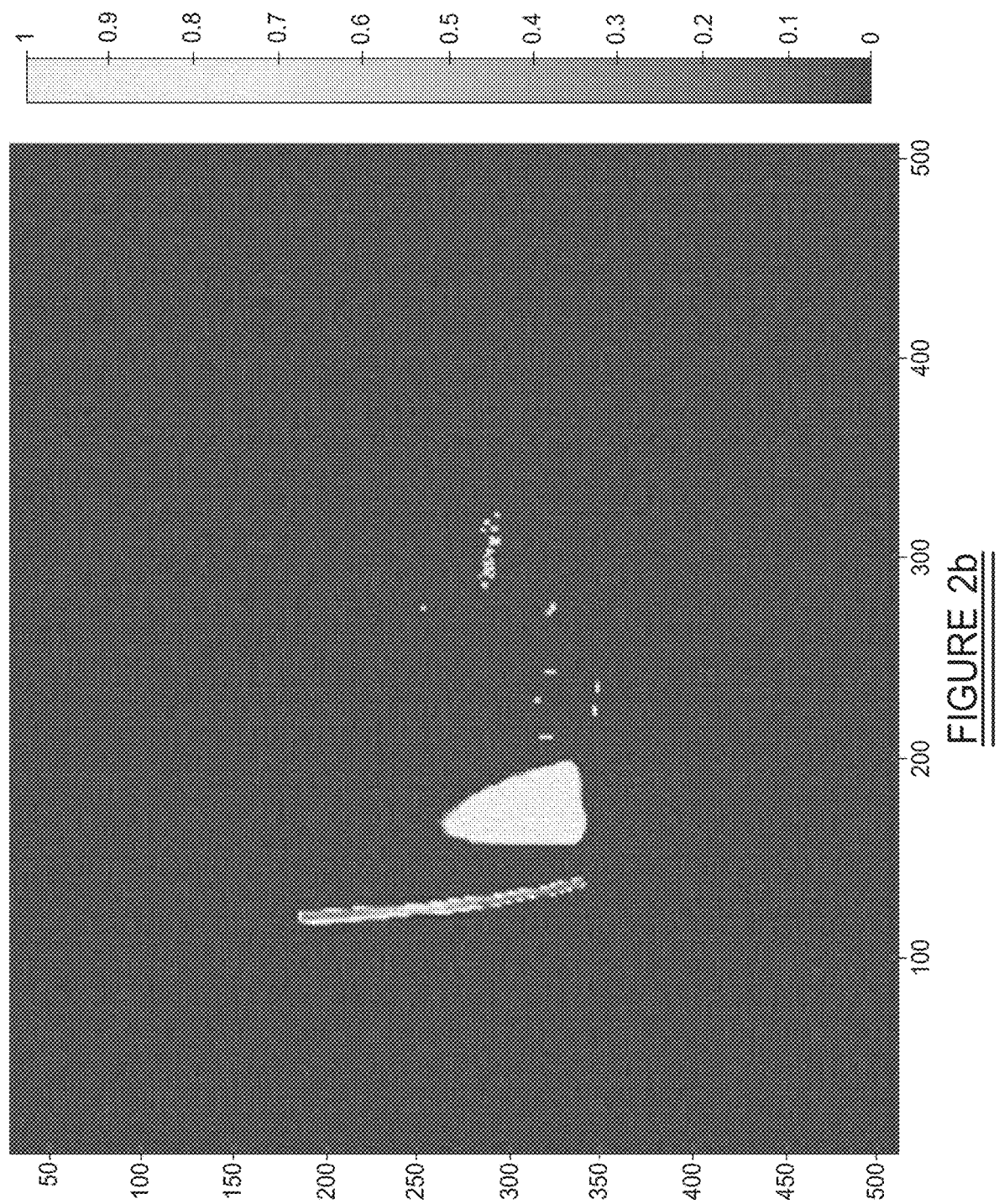
FIGS. 2*b*-2*d* show decluttered alarm images for saline, rubber and clay, respectively.
Figure 2C:
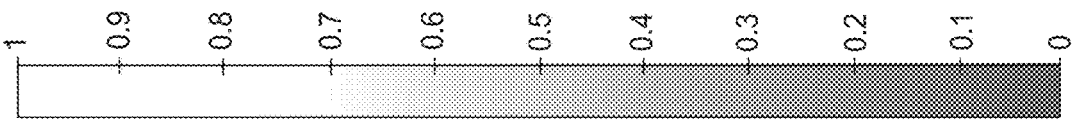
Figure 2C:
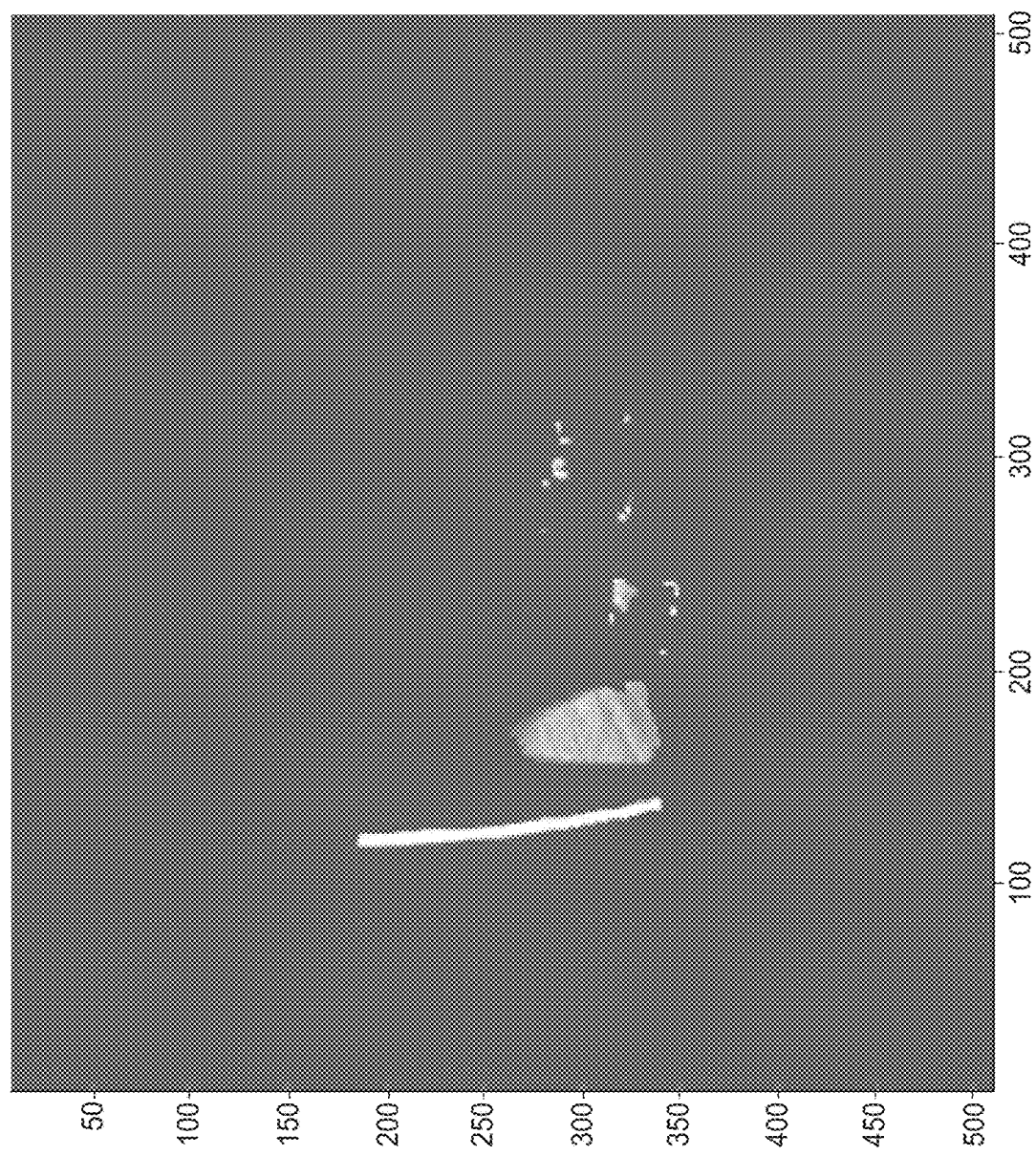
Figure 2D:
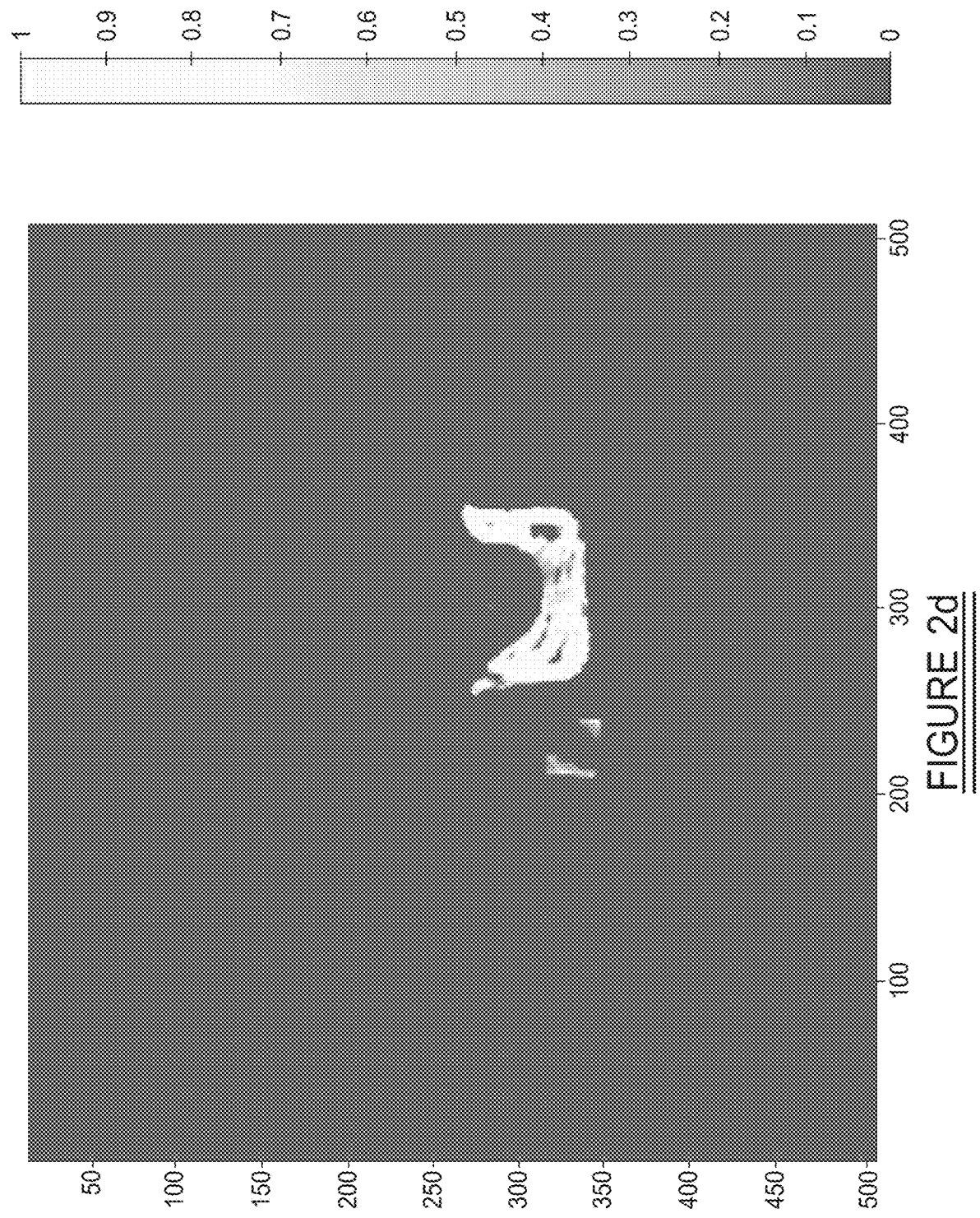
Figure 2F:
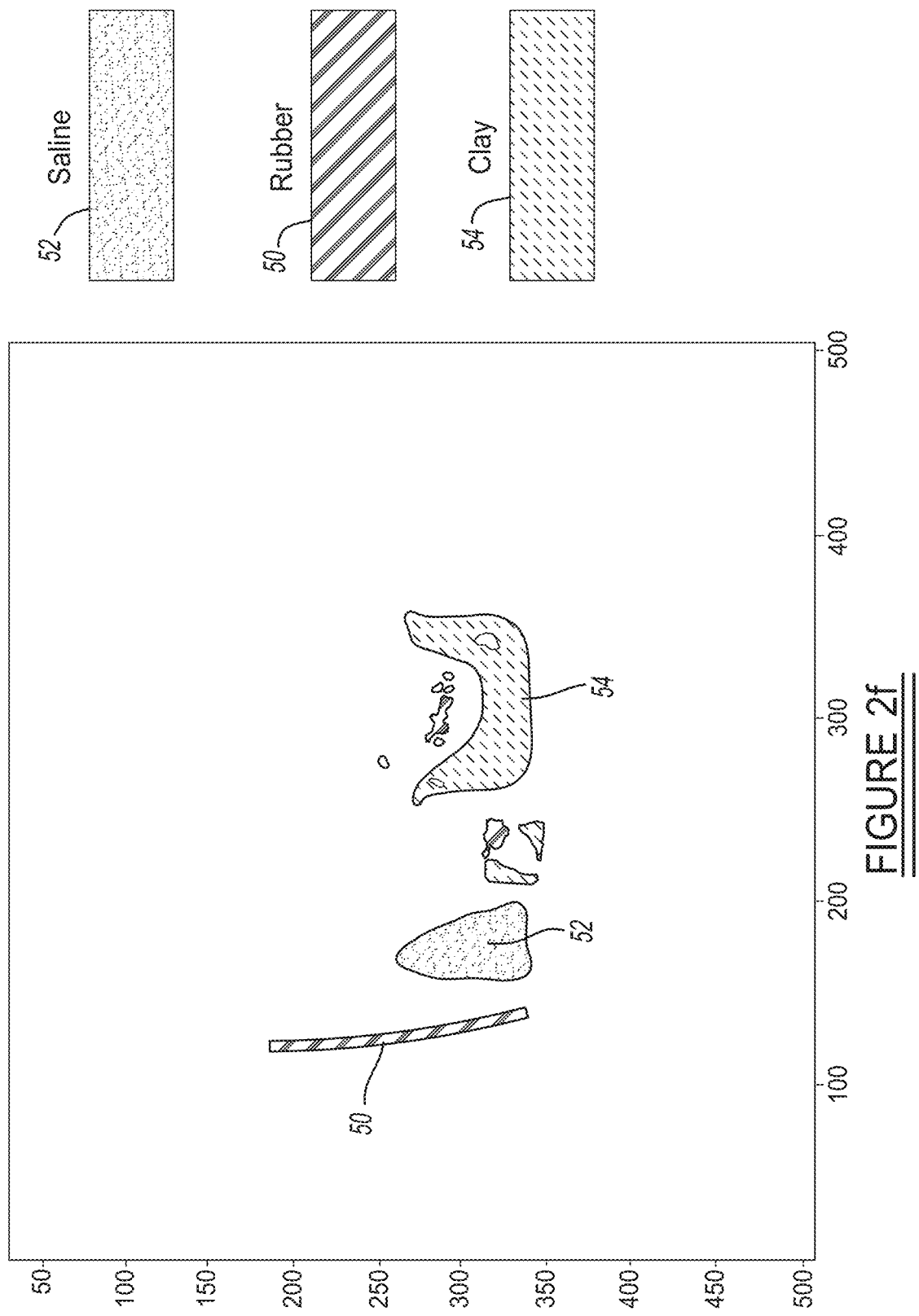
FIG. 2*f* illustrates the best MOI image.

FIG. 2a shows one slice of a single energy CT image. FIGS. 2b, 2c and 2d show the decluttered alarm images $a_k(x,y,z)$ associated with three MOIs 50, 52 and 54. FIG. 2e shows the best alarm image a(x,y,z) and FIG. 2f shows the best MOI image M(x,y,z), in which MOI 50 is rubber, MOI 52 is saline and MOI 54 is clay. Note that the alarm value of a voxel could be based on a posterior estimate (as opposed to a likelihood estimate), in which case p(v|M) would be replaced by the posterior P(M|v) in (2)-(3) and a(x,y,z)=p(x,y,z) in (4). The posterior P(M|v) is the probability that voxel with value v is composed of material M.

Prioritizing Seeds for Region Growing with Learned Constraints (PSRG Module 22)

Alarm values at (x,y,z) are based solely on local context (i.e. solely on the values of CT image voxels within the consensus relaxation neighborhood of (x,y,z)). When there are multiple MOIs, there is a chance that the likelihood functions for at least some of them will overlap, and this chance will tend to increase as the number of MOIs grows. The material compositions of certain voxels can become ambiguous when the likelihood functions for different MOIs overlap. Such ambiguity is problematic because it can lead to highly fragmented objects and missed detections.

Ambiguity in material type may be handled by selecting a seed voxel and associating the best MOI explanation of the seed voxel with all voxels in the region grown from that seed. The region associated with seed voxel $(x_s,y_s,z_s)$ is thus grown not in the CT image, but instead in the 3D image $a_k(x,y,z)$ of voxel alarm values for which $k=M(x_s,y_s,z_s)$ is the ID of the best MOI explanation for the seed voxel. Seed voxel candidates (x,y,z) are prioritized in descending order of likelihood p(x,y,z) for the best MOI explanation. The voxels for which p(x,y,z)>0 are sorted in descending order of likelihood value. Voxels with large likelihood values are stronger candidates as seeds for region growing than voxels with smaller likelihood values. However, voxels v(x,y,z) for which the alarm value a(x,y,z) in Equation 4 (a normalized likelihood value from zero to one) is less than $a_{seed,min}$ are removed from the list of candidate seeds. For seed prioritization, the global context parameter that can be prescribed or potentially learned is thus the lower bound $a_{seed,min}$ on seed voxel alarm values.

Region Growing with Learned Constraints (GR Module 24)

Using GR module 24, regions may be grown using connected component analysis on voxel neighborhoods of some size (typically 3×3×3). More precisely, a voxel (x,y,z) is added to the region grown from seed voxel $(x_s,y_s,z_s)$ if it lies within a predetermined neighborhood, for example within the 3×3×3 neighborhood, of some voxel that was previously added to the region, and it was not consumed by a different region, and $$a_k(x,y,z) \geq \beta_k a_k(x_s,y_s,z_s) \quad \text{Equation 5}$$

for some region growth constraint factor $0 < \beta_k \leq 1$. As region growing progresses, seed voxels are chosen from among those voxels (x,y,z): $a(x,y,z) > a_{seed,min}$ that were not previously consumed by a grown region. Thus, while the nominal set of candidate seed voxels is the set of all voxels for which $a(x,y,z) > a_{seed,min}$, the set of candidate seed voxels can diminish as regions are grown.

From Equation 5, it is clear that the decision threshold on voxel alarm value for region growing depends not only on the MOI type of the seed (through $\beta_k$, which varies with MOI type k), but also on the likelihood value of the seed voxel in the alarm image for MOI k (through $a_k(x_s,y_s,z_s)$, which for a given MOI type k, varies with seed voxel location). In other words, the decision threshold on voxel alarm value for region growing varies not only from MOI to MOI, but also from region to region for a given MOI. For region growing, the global context parameters to be prescribed or potentially learned are the region growth constraint factors $\beta_k$ for the various MOIs k. One could constrain the values of these constraint factors to be the same for all k.

Correcting Errors in Estimates of Object/Region Material Composition (CERMC Module 26)

Using CERMC module 26, the supervoxel associated with a grown region is obtained by computing the mean of CT image values over all voxels in that object. The most likely material explanation for the supervoxel can be different than for the seed voxel. When this happens, the estimate of object material composition is based on the supervoxel and not the seed voxel. Objects for which MOI 0 is the best explanation of the supervoxel are eliminated because they most likely either contain some material that is not on the list of MOIs or are part of the background.

Using a Trained Classifier to Identify Objects of Interest (CDO Module 30)

For each detected object (or segment) s, there is an associated vector of object context features f(s). Examples of object context (OC) features for OOIs that contain explosives include mass, thickness, concealment (which reflects proximity to higher attenuating materials), and MOI score (the alarm value for the object supervoxel, which is based on object material composition). Object context features may draw from both the object (e.g., mass) and its surround (e.g., concealment).

One could consider the OC parameters to be the set of minimal values for the OC features that optimizes ATR system 10 performance. For any detected object s whose OC features satisfy the constraints imposed by these parameters, one could then define the ATR score A(s) (from zero to one) as the MOI score for s. Alternatively, one could envision some widely used type of trained classifier (e.g., a 3-layer perceptron, a support vector classifier, a random forest, etc.) that returns a decision d(s) (one for "OOI" vs. zero for "not OOI") and an ATR score A(s) (from zero to one). The parameters of this classifier would be the OC parameters.

Figure 3A:
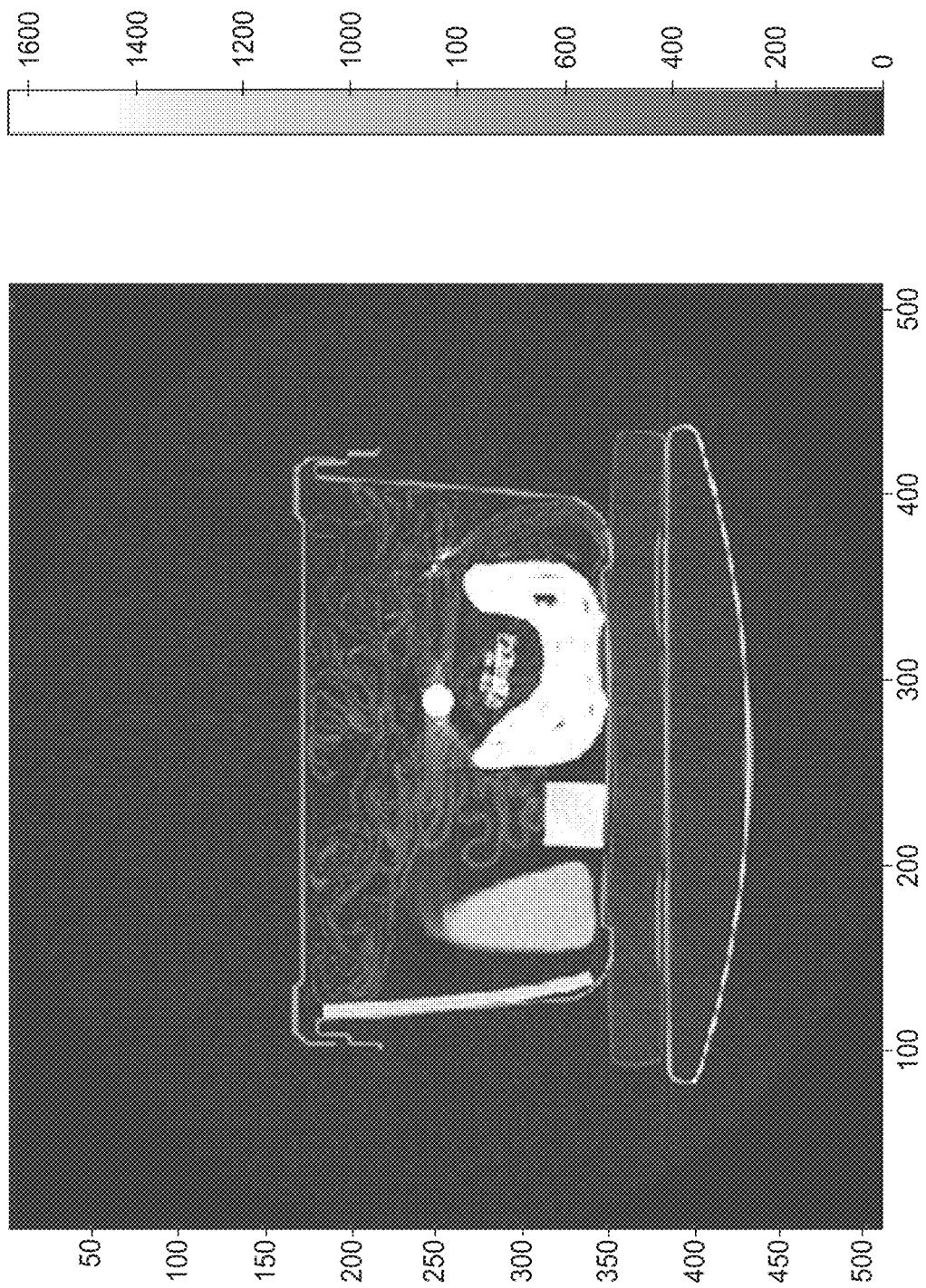
FIG. 3*a* again shows a CT image slice from FIG. 2*a*.
Figure 3B:
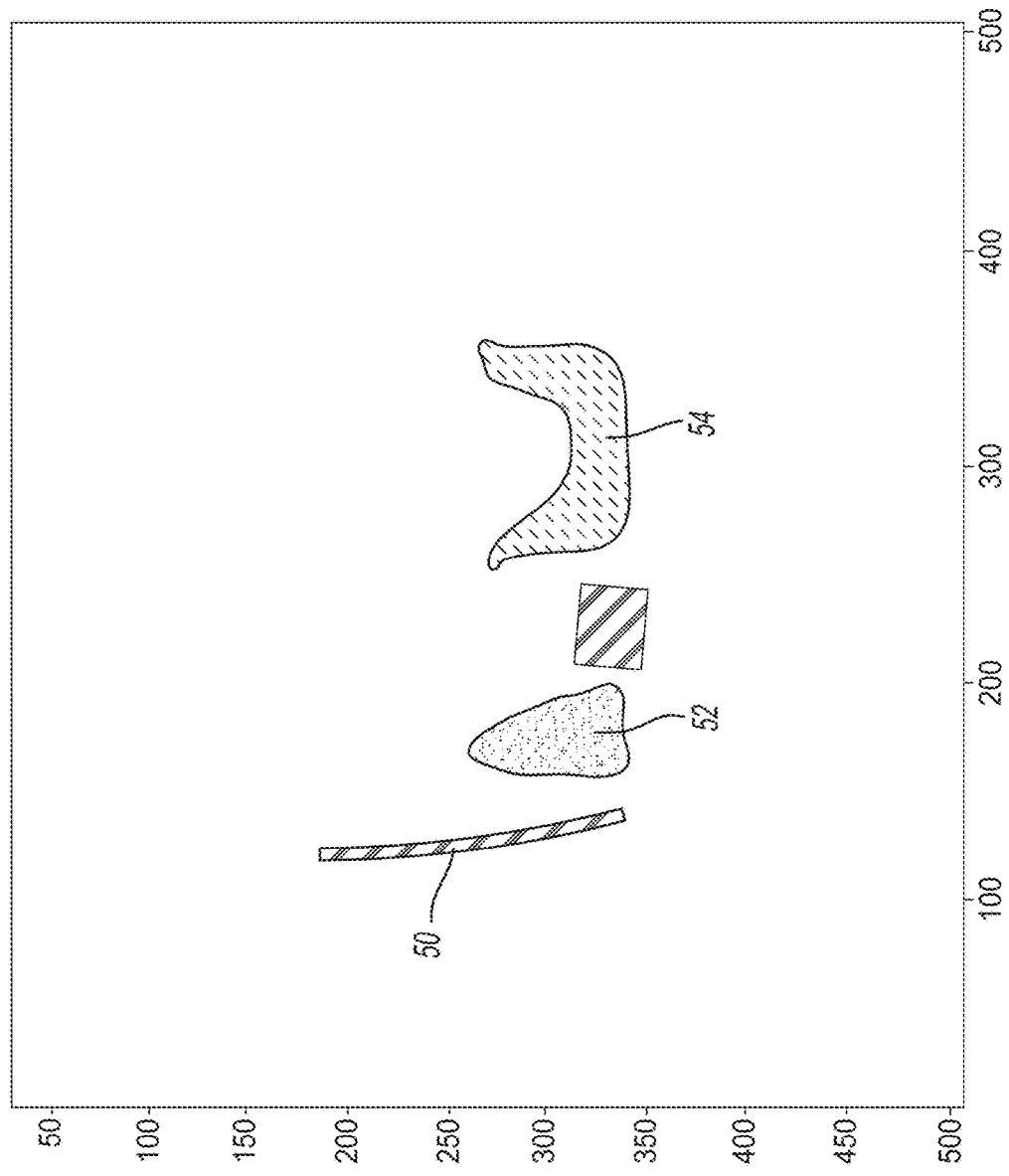
FIG. 3*b* shows a ground truth image slice for the image slice of FIG. 3*a*.
Figure 3C:
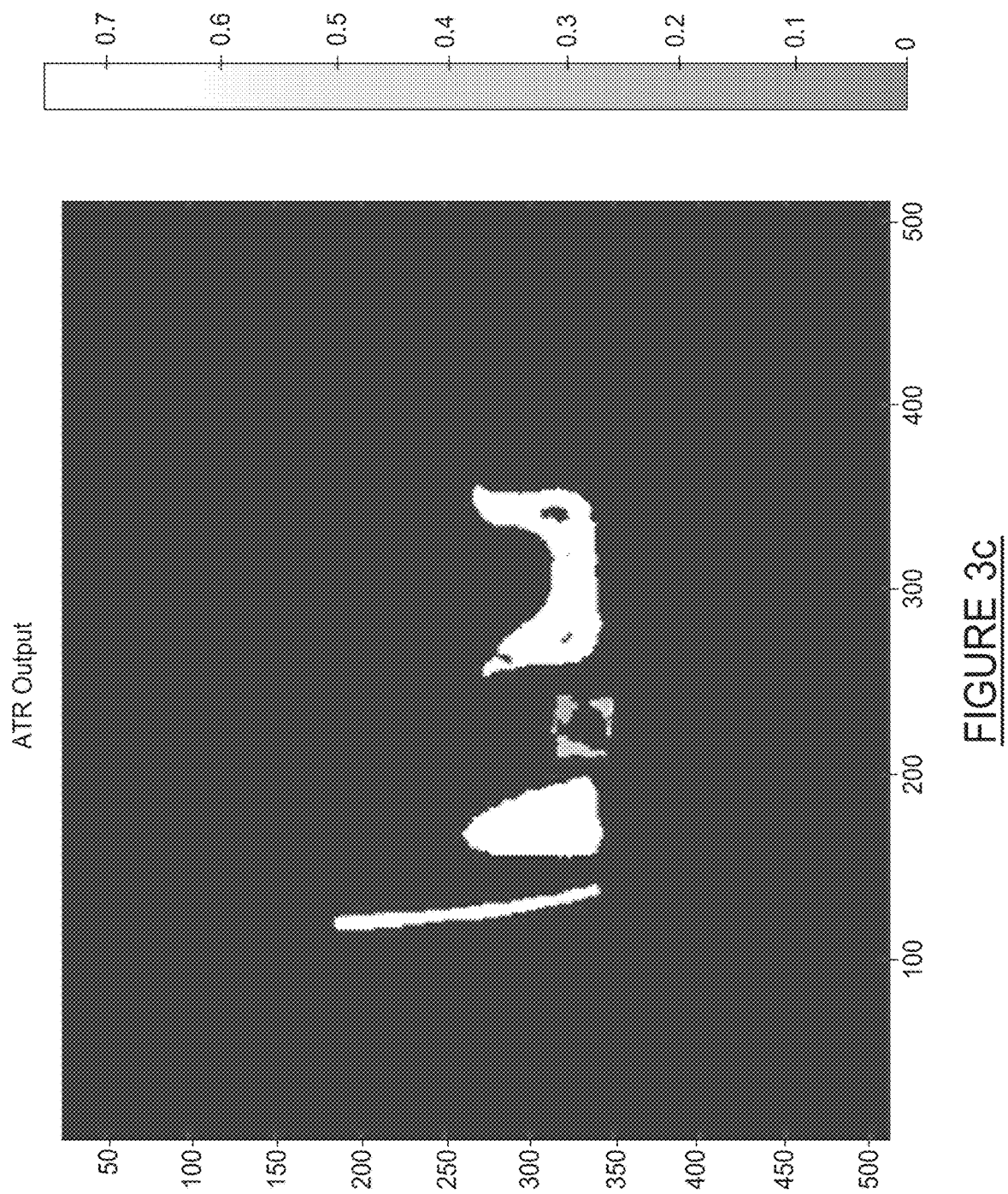
FIG. 3*c* shows a slice of the corresponding ATR object alarm image for the slice shown in FIG. 3*a*.

The image of ATR alarm objects contains voxels of value zero in the background and voxels of value A(s) within alarm object s. The displayed monochromatic brightness of an ATR alarm object in such an image will thus be proportional to the likelihood (or potentially the probability) that the object actually contains some material of interest. FIG. 3a shows the same slice of the CT image from FIG. 2a next to the ground truth for that slice (FIG. 3b) and the corresponding ATR object alarm image (FIG. 3c).

Learning the Global and Object Context Parameters

The learned global context (GC) parameters apply to the ATR system 10 (i.e., the trained object detector) of FIG. 1. For any candidate set g of GC parameter values, there is an optimal set x(g) of object context (OC) parameter values that apply to the trained object classifier (FIG. 1). Once the GC parameters g have been specified, the OC parameters x(g) can be quickly learned from training data. One option would be to consider a set of candidate minimal values for the OC features and search over that set to identify those candidate OC parameter values (bounds on OC feature values) that optimize ATR performance. Another option would be to construct a training set of OC features f for objects labeled as positive (of interest) vs. negative (not of interest). This training set would be obtained by comparing the objects detected in training images using specified GC parameters g to ground truth objects. Feature vectors associated with true positive objects would be labeled as "of interest". Feature vectors associated with false positive objects would be labeled as "not of interest". This training set would be used to train a traditional classifier (e.g., a 3-layer perceptron, a support vector classifier, a random forest, etc.) that would return a classification statistic or ATR score for each detected object.

Figure 4:
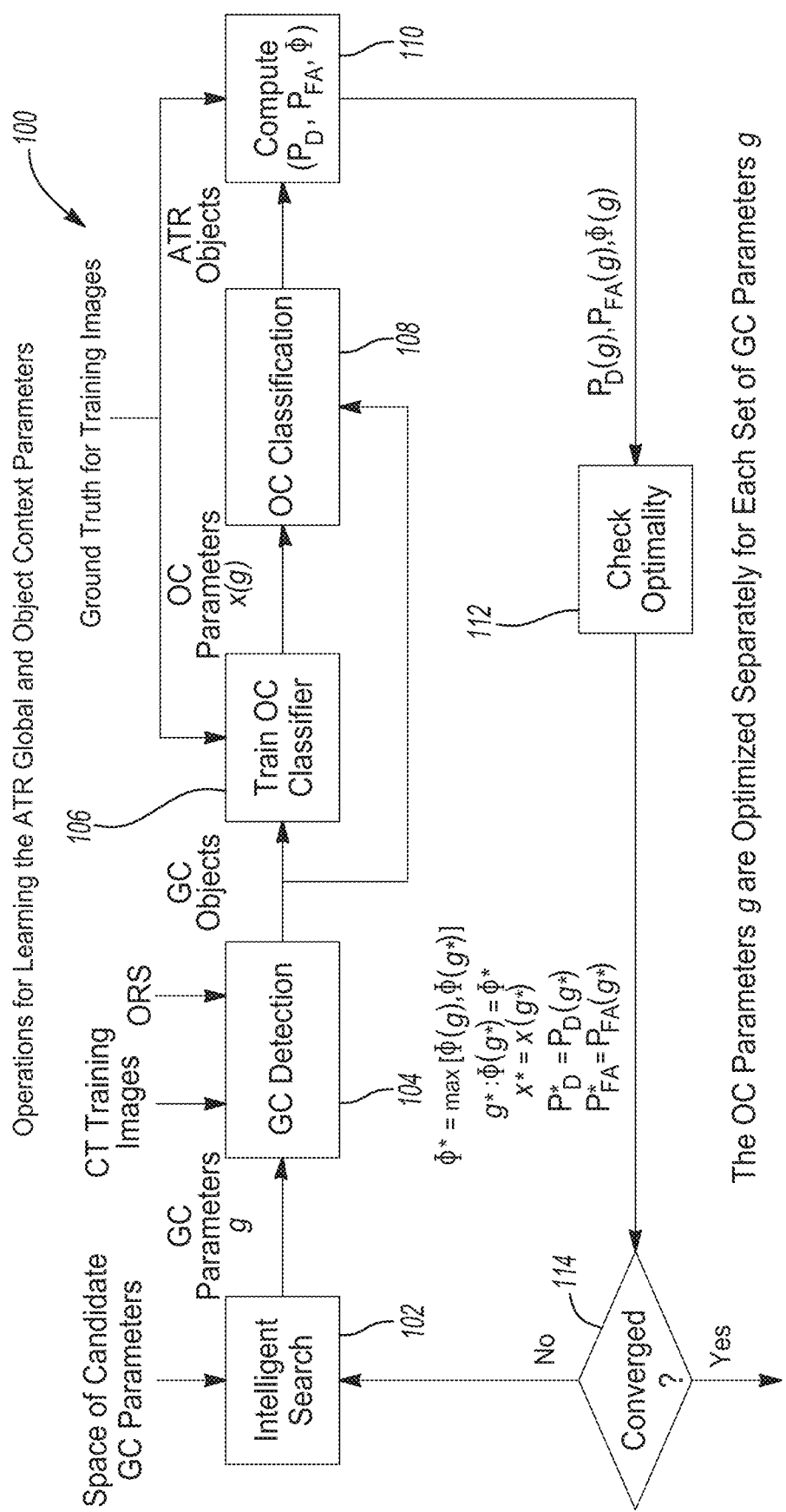
FIG. 4 is a flow diagram of operations performed for learning the ATR global and object context parameters used by various modules of the ATR system.

FIG. 4 shows a block diagram 100 for operations which may be performed off-line by the ATR training system 100 to learn the jointly optimal parameters [g*, x(g*)] from CT images of training bags (operation 104), ground truth for those bags (operations 106-110) and an ORS. For each set of candidate GC parameters g, object detection must be applied to every training image using an intelligent search operation 102. The amount of time it takes to learn g* and x(g*) from training data (operations 104 and 106) is thus proportional to the number of candidate sets g of GC parameters in the search space and the size of the training set. For a given training set, the keys to fast parameter learning are thus to minimize the number of GC parameters and to use intelligent search operation 102. Intelligent search becomes critically important as the number of GC parameters grows because exhaustive grid search suffers from the curse of dimensionality (the number of candidate sets of parameters g grows exponentially with the number of parameters). The number of GC parameters to learn can be reduced by using prescribed values for parameters whose values are expected to have lower impact on detection performance. If the number of GC parameters is still significant, intelligent search methods, such as random search, Bayesian optimization, gradient-based optimization and evolutionary optimization can be much more efficient than exhaustive search.

For a given candidate set [g, x(g)] of ATR parameters, one can compute the detection and false alarm probabilities $P_D(g)$ and $P_{FA}(g)$, at operation 110. The objective function $$\Phi(g) = P_D(g)/[1 + kP_{FA}(g)] \qquad \text{Equation 6}$$

is maximized by maximizing $P_D(g)$ and minimizing $P_{FA}(g)$ simultaneously. The training algorithm, which is associated with operation 112, computes the solution to the equation $$g^* = \operatorname*{argmax}_g \phi(g) \qquad \text{Equation 7}$$

In Equation 6, $0 < k < 1$ if false positives are less critical than true positives, $k = 1$ if true and false positives are equally important, and $k > 1$ if false positives are more critical than true positives. Operation 114 checks to see if the next candidate parameters in the intelligent search improved upon (PD, PFA) relative to previous candidate parameters, which helps to establish convergence.

Approximated Likelihood Functions for Individual MOIs

The transformation in Equations 1-4 from CT image voxels v(x,y,z) to alarm values $a(x,y,z) \in (0,1)$ depends on likelihood function estimates $p(v|M_k)$ for the various MOIs $M_k$. The ATR alarm object grown from seed voxel $v_{seed}$ is grown in the image $a_k(x,y,z)$ of voxel alarm values, where k is the ID of the most likely MOI explanation for $v_{seed}$. ATR performance is thus sensitive to the likelihood function estimates $p(v|M_k)$.

Ideally, there would be exactly one distinct characteristic voxel value in the CT image for each MOI $M_k$. In this case, $p(v|M_k)$ would be a delta function at a distinct location in the space spanned by all possible values for CT image voxels v. However, in real CT images, $p(v|M_k)$ will typically have some nonzero spread about a single peak. MOIs $M_k$ are easier to distinguish when the peaks of their likelihood functions are more widely separated and the likelihood functions are more narrow.

Unfortunately, narrow likelihood functions can lead to alarm images in which the variance of a(x,y,z) values within an object that contains MOI $M_k$ is large (significantly greater than zero). Large variances make it harder to grow regions associated with distinct OOIs. To reduce this variance, one can widen the likelihood function for each MOI $M_k$ so that varies more slowly within an appropriate range of the peak location. Such likelihood functions lead to images a(x,y,z) of alarm values that are more homogeneous within OOIs and which are thus easier to segment.

Figure 2G:
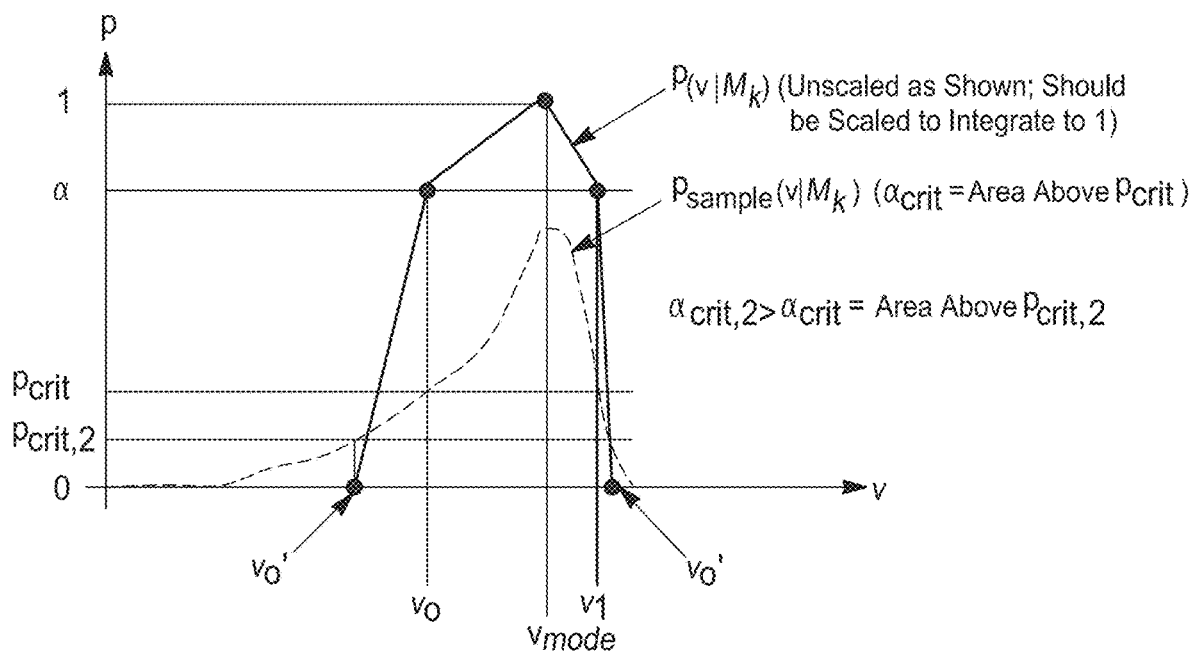
FIG. 2*g* illustrates a graph to help illustrate a geometry for approximating a widened piecewise linear likelihood function for a MOI $M_k$ in one dimension.

FIG. 2g illustrates a method for widening a likelihood function $p(v|M_k)$ for MOI $M_k$ based on an initial estimate of the likelihood function (the sample likelihood function). The illustration, while provided in one dimension for clarity and simplicity, readily extends to two dimensions. As described above, the goal is to widen the likelihood function $p(v|M_k)$ to enable the ATR to more easily extract distinct OOIs composed of material $M_k$ from images $a_k(x,y,z)$ of alarm values for MOI $M_k$. The initial estimate is either a sample PDF for voxels composed of material $M_k$ derived from training data or an ROR supplied for material $M_k$. If an ROR is supplied, the sample PDF is taken as a uniform PDF fit to the ROR. Otherwise, the sample PDF $p_{sample}(v|M_k)$ derived from training data is used.

First, the mode $v_{mode}$ of the sample PDF is located (for the case of RORs, the mode is chosen as the center of the ROR). The value $p_{crit}$ is computed above which some fraction $\alpha_{crit}$ of the area or volume under the sample PDF curve or surface lies. In one dimension, the first points $v_0$ and $v_1$ to either side of the mode at which the horizontal line $p=p_{crit}$ intersects the sample PDF is then found. In two dimensions, the contour that contains the mode and whose perimeter consists only of those points on the sample PDF surface for which $p=p_{crit}$ is found. $p(v_{mode}|M_k)$ is set to unity. In one dimension, $p(v_0|M_k)=p(v_1|M_k)$ is set to some value $\alpha \in [0,1]$. In our case, $\alpha$ should be close to unity (say $\alpha=0.8$) so that the approximated likelihood will vary slowly within the interval from $v_0$ to $v_1$ about the mode. In two dimensions, $p(v|M_k)$ is set to a at each contour point v.

As shown in FIG. 2g, for one dimension, the interval $[v_0, v_1]$ that contains the mode is extended to $[v'_0, v'_1]$ such that $P_{sample}(v'_0|M_k)=p_{sample}(v'_1|M_k)=p_{crit,2}$ and $p(V'_0|M_k)=p(V'_1|M_k)$ is set to zero. The value $p_{crit,2}<p_{crit}$ is computed above which some fraction $\alpha_{crit,2}>\alpha_{crit}$ of the area or volume under the sample PDF curve or surface lies. The five vertices are then connected to produce an approximated piecewise linear likelihood function $p(v|M_k)$ which is then scaled so that it integrates to one. In two dimensions, the a contour is extended outward to the level set for which $p_{sample}(v|M_k)=p_{crit,2}$, and at every such point v, $p(v|M_k)$ is set to zero. A continuous surface is then fit to the mode of value one, the contour points of value $\alpha$ and the extended contour points of value zero. The surface is then scaled so that the volume under the surface is unity.

Figure 5:
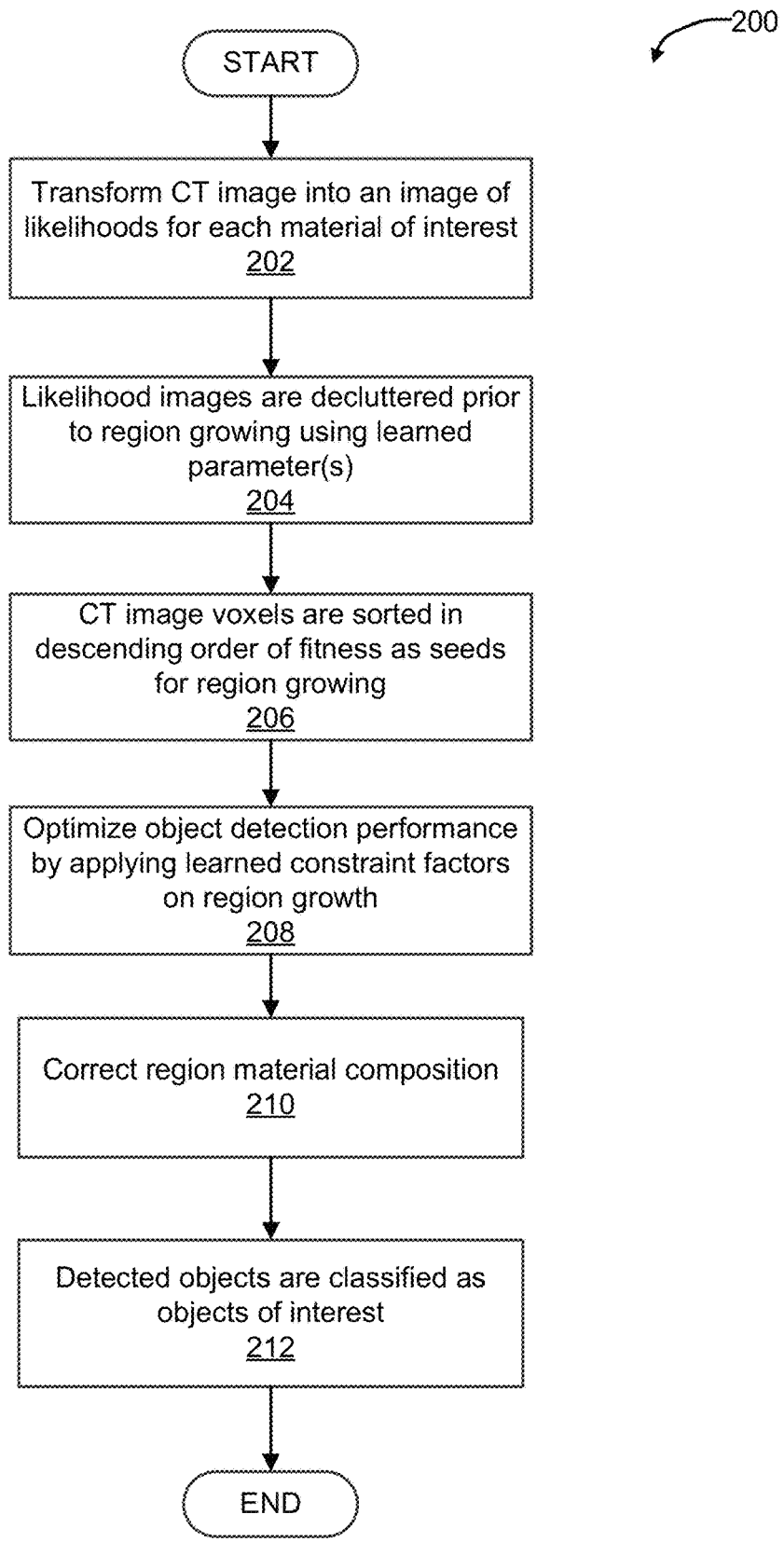
FIG. 5 is a flowchart providing a high level summary of operations performed by the ATR system of FIG. 1.

Referring now to FIG. 5, a flowchart 200 is shown to summarize, at a high level, major operations performed by the various modules of the system 10 shown in FIG. 1. From FIG. 5, initially at operation 202, the CT image is transformed into an image of likelihoods for each material of interest. At operation 204, as noted herein, an important operation is decluttering likelihood images prior to region growing for optimal object detection performance. This is accomplished by EVLD module 28 using learned declutter parameters. At operation 206 the PSRG module 22 selects seed voxels for region growing. This is accomplished by sorting CT image voxels in descending order of fitness as prioritized seed candidates for region growing. Voxel fitness is proportional to the likelihood that a voxel contains some material of interest (MOI). Detection performance can be optimized by learning the minimum fitness level for a voxel to qualify as a seed. The assumed material composition of a region grown from a seed voxel is the most likely material composition of the seed voxel itself. Candidate seed voxels consumed by a previously grown region are removed from the list of candidates. At operation 208, region growth is limited by learned constraint factors.

At operation 210 the GR module 24 is used as the global context mechanism for correcting region material composition. Each voxel in each region is assigned the ID of the most likely material explanation of its supervoxel (i.e., the mean of all voxels in the region). At operation 212 the CDO module 30 is used as the object context mechanism for classifying detected objects as objects of interest. This is accomplished by classifying detected objects as objects of interest (OOIs) by applying a classifier to vectors of object spatial context features. The classifier is trained for optimal performance. For example, objects can be classified as threat vs. non-threat based on a combination of MOI likelihood, mass and thickness. If these quantities are too small, the classifier will output a low probability of threat. If they are all within expected limits for threats, the classifier will output a higher probability of threat.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An automatic threat recognition system for scanning an article to identify at least of a contraband item or an item of interest contained within the article, the system comprising:
   a computed axial tomography (CAT) scanner for scanning the article to obtain a CT image scan of objects within the article, the CT image scan represented by a plurality of two dimensional (2D) image slices of the article and its contents, wherein each said (2D) image slice includes information forming a plurality of voxels;
   a computer configured to receive the information and, prior to aggregating any ones of the plurality of the voxels associated with the CT image, to:
      generate an alarm value for each said voxel, the alarm value representing a likelihood that the voxel is associated with a material of interest (MOI), and prioritize the voxels according to their alarm values, and wherein the MOI is a material that may potentially be used to construct at least one of a contraband item or an item of interest,
      use the prioritized alarm voxels to construct one likelihood image for each said MOI;
      use one trained classifier for each said likelihood map to create a decluttered likelihood image, the decluttered likelihood image for each MOI having voxels removed therefrom which are not sufficiently closely related to an object containing the MOI;
   merging the decluttered likelihood images to create an initial iteration of an alarm image;
   further analyze the alarm values of the voxels and aggregate ones of the voxels together from the alarm image to create an enhanced alarm image in which distinct objects may be discernable within the enhanced alarm image; and
   from the enhanced alarm image, detecting whether at least any of the distinct objects represents at least one of a contraband item or an item of interest.

2. The system of claim 1, wherein the computer is configured to use the alarm values for the voxels to make likelihood determinations to select specific ones of the voxels to be used as seed voxels, the seed voxels being starting points in aggregating other ones of the voxels.

3. The system of claim 2, wherein the computer is configured to carry out the aggregating by selecting ones of the voxels having a likelihood of being of the same or a similar MOI as one of the seed voxels, and which are in a predetermined proximity to a given one of the seed voxels.

4. The system of claim 1, wherein the computer is configured to use learned global context parameters to assist with at least one of:
   decluttering the images of alarm values prior to aggregation;
   determining suitable seed voxel candidates for aggregating the voxels, or
   limiting a growth of voxel aggregations.

5. An automatic threat recognition (ATR) method for detecting at least one of a contraband item or an item of interest contained within an article, from a plurality of objects contained in the article, the method comprising:
   defining a plurality of materials of interest (MOIs) representing materials that are to be identified, and which may be used in constructing at least one of a contraband item or an item of interest;
   using a computed axial tomography (CAT) scanner to scan the article to obtain a CT image scan of the objects within the article, the CT image scan represented by a plurality of two dimensional (2D) image slices of the article and its contents, wherein each said two dimensional (2D) image slice includes information forming a plurality of voxels;
   prior to aggregating any of one or more of the plurality of voxels, generating an alarm value for each said voxel and each said material of interest (MOI), the alarm value representing a likelihood ranking indicating how strongly a specific voxel is likely to be associated with a specific one of the MOIs that may potentially be used to find at least one of a contraband item or an item of interest contained within the article;
   use the alarm values of the voxels to construct one likelihood image for each MOI;
   use a trained classifier for each said MOI to help analyze the likelihood image for that said MOI by creating a decluttered likelihood image for each said MOI having voxels removed therefrom which are not sufficiently closely related to an object containing the MOI;
   merging the one or more decluttered likelihood images to create an initial alarm image;
   further analyzing the alarm values of the voxels and aggregating ones of the voxels together from the alarm image to create an image of objects detected by the ATR, such image containing either no objects, one object or multiple objects; and
   using the enhanced alarm image to detect whether at least one of the objects represents at least one of a contraband item or an item of interest.

6. The method of claim 5, wherein specific ones of the voxels having a highest priority ranking, for each MOI, are defined as seed voxels, the seed voxels being used as a starting point for voxel aggregation to produce the image of objects detected by the ATR method.

7. The method of claim 5, wherein the detected objects in the image of objects detected by the ATR method are classified as either:

- of interest, meaning they represent at least one of a contraband item or an item of interest; or
- not of interest, meaning they do not represent at least one of a contraband item or an item of interest;

using a trained object classifier.

\* \* \* \* \*